UNITED STATES PATENT OFFICE.

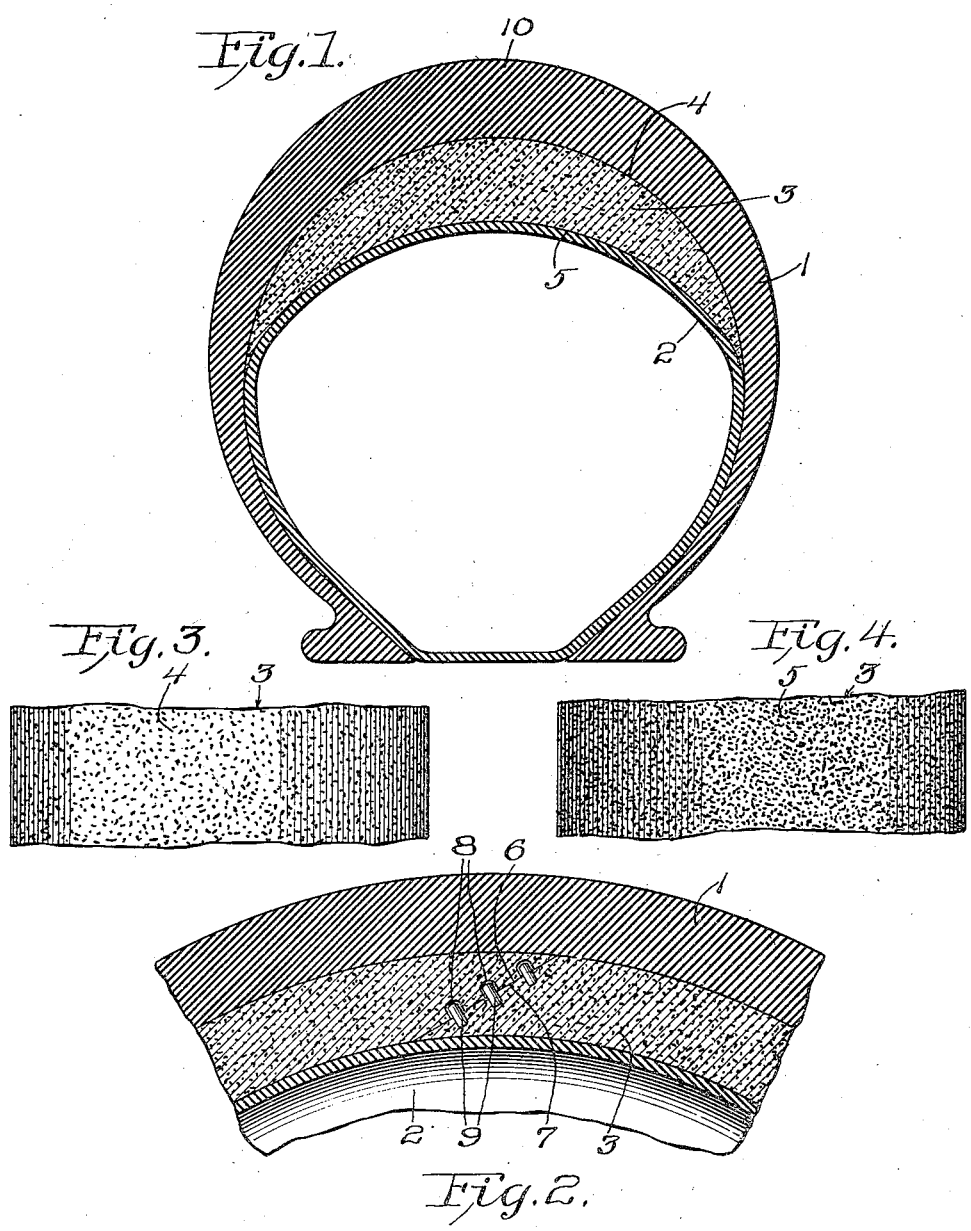

WILLIAM N. KELLEY AND JOSEPH C. PORTER, OF PITTSBURGH, PENNSYLVANIA.

INNER-TUBE PROTECTOR FOR PNEUMATIC TIRES.

1,169,964.  Specification of Letters Patent.  Patented Feb. 1, 1916.

Application filed July 6, 1915. Serial No. 38,189.

*To all whom it may concern:*

Be it known that we, WILLIAM N. KELLEY and JOSEPH C. PORTER, citizens of the United States, residing at Pittsburgh, in the county of Allegheny and State of Pennsylvania, have invented certain new and useful Improvements in Inner-Tube Protectors for Pneumatic Tires, of which the following is a specification.

This invention relates to an inner tube protector for pneumatic tires, and has for its object to provide a device of such type, in a manner as hereinafter set forth, which is interposed between the inner tube and outer shoe of the ordinary type of pneumatic tire and provides means for the reducing to a minimum of the puncturing of the inner tube and further providing means for temporarily maintaining the inner tube in an inflated condition in case of puncture.

A further object of the invention is to provide an inner tube protector consisting of a cellular resilient body, somewhat similar to sponge rubber, adapted to be interposed between the inner tube and outer shoe of a tire for the reducing to a minimum of the puncturing of the inner tube and at the same time of the necessary elasticity so as not to interfere with the cushioning function performed by the inner tube and outer shoe of a pneumatic tire.

A further object of the invention is to provide an inner tube protector formed of a cellular resilient body, somewhat similar to sponge rubber, adapted to be interposed between the inner tube and outer shoe of a pneumatic tire and of the necessary elasticity whereas in case of a nail, tack, or other object entering the protector the latter will close when said nail, tack or other object is withdrawn from the protector thereby closing the opening and in case of the inner tube being punctured the closing of the opening will prevent discharge of air from the inner tube temporarily under such conditions maintaining the tire for a short while in an inflated condition reducing thereby the period of the wheel traveling upon a flat tire.

Further objects of the invention are to provide an inner tube protector for pneumatic tires which is simple in its construction and arrangement, strong, durable, efficient in its use, conveniently positioned, and inexpensive.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views: Figure 1 is a vertical sectional view of a pneumatic tire, showing the adaptation therewith, of an inner tube protector in accordance with this invention. Fig. 2 is a sectional view, broken away, of a pneumatic tire showing the adaptation therewith of an inner tube protector in accordance with this invention, the section being at right angles to the section shown in Fig. 1. Fig. 3 is a top plan view, broken away, of the protector. Fig. 4 is an inverted plan view, broken away, of the protector.

Referring to the drawings in detail 1 denotes the shoe of a pneumatic tire, of the clencher type, and 2 the inner tube, the latter being inflated. The inner tube protector in accordance with this invention consists of an annulus formed from a strip of cellular resilient material, somewhat similar to sponge rubber, and which is crescent shape in transverse section. The annulus is indicated at 3 and the outer terminus thereof is indicated at 4 and the inner face at 5.

The strip of cellular resilient material has its ends oppositely beveled as at 6, 7, and when the annulus 3 is set up the said ends 6, 7, overlap each other. The end 6 is formed with a series of pockets 8 and the end 7 with a series of connecting members 9, formed of any suitable material, preferably hard rubber, and each of said members 9 is cylindrical in contour and project from the end 7 so that they can engage in the pockets 8 whereby the ends 6, 7, of the cellular resilient strip are connected together to form the annulus 3. The annulus 3 is interposed between the outer shoe 1 and inner tube 2 and the roughened inner and outer faces of said annulus 3, when the inner tube is inflated, arrest circumferential movement of the annulus 3 with respect to the outer shoe 1 and inner tube 2.

Owing to the positioning of the annulus 3 between the outer shoe 1 and tube 2 it is obvious that in case the tread 10 of the outer shoe 1 is pierced by an object that said annulus 3 will, unless said object is of a considerable length, prevent the puncturing of the inner tube 2 and if the object should be of a length to pierce the inner tube 2 the resilient character of the annulus 3 is such as to tightly grip the object under such conditions preventing leakage, or reducing it to a minimum, and also when the object is withdrawn from the annulus 3 the opening formed by the object will be immediately closed in view of the character of the material of which said annulus 3 is constructed, under such conditions the tire will not immediately deflate and the period of travel of the wheel on a flat tire will be materially reduced.

What we claim is:—

1. A protector for the inner shoe of pneumatic tires comprising a split annulus formed of resilient material and having the ends thereof oppositely beveled, one of said ends provided with a plurality of pockets, and a plurality of connecting members each having a portion thereof embedded in the other of said ends and the remaining portion seated in said pockets for connecting the ends of the annulus together, said members extending at an inclination.

2. A protector for the inner shoe of pneumatic tires comprising a split annulus formed of resilient material and having the ends thereof oppositely beveled, one of said ends provided with a plurality of pockets, and a plurality of connecting members each having a portion thereof embedded in the other of said ends and the remaining portion seated in said pockets for connecting the ends of the annulus together, said pockets being circular in contour and said connecting members being cylindrical.

In testimony whereof we affix our signatures in the presence of two witnesses.

WILLIAM N. KELLEY.
JOSEPH C. PORTER.

Witnesses:
LUELLA H. SIMON,
B. E. JENKINS.